(12) United States Patent
Evans et al.

(10) Patent No.: US 6,454,536 B1
(45) Date of Patent: Sep. 24, 2002

(54) ADHESION ENHANCERS TO PROMOTE BONDS OF IMPROVED STRENGTH BETWEEN ELASTOMERS METALS IN LIGHTWEIGHT AIRCRAFT FAN BLADES

(75) Inventors: Charles R. Evans, Cincinnati; Douglas D. Ward; Joseph T. Begovich, Jr., both of West Chester, all of OH (US); Wendy W. Lin, Niskayuna; Herbert S. Chao, Schenectady, both of NY (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 09/500,890

(22) Filed: Feb. 9, 2000

(51) Int. Cl.7 ................................................. F01D 5/28
(52) U.S. Cl. ................... 416/229 A; 416/224; 416/233; 416/241 A
(58) Field of Search .............................. 416/224, 229 R, 416/229 A, 230, 241 A, 232, 233

(56) References Cited

U.S. PATENT DOCUMENTS

| | | | |
|---|---|---|---|
| 5,295,789 A | * 3/1994 | Daguet | 416/241 A |
| 5,634,771 A | 6/1997 | Howard et al. | |
| 5,655,883 A | 8/1997 | Schilling | |
| 5,720,597 A | 2/1998 | Wang et al. | |
| 5,791,879 A | 8/1998 | Fitzgerald et al. | |
| 5,839,882 A | 11/1998 | Finn et al. | |
| 5,913,661 A | * 6/1999 | Panovsky et al. | 416/229 A |
| 5,931,641 A | 8/1999 | Finn et al. | |
| 5,947,688 A | * 9/1999 | Schilling et al. | 416/233 |
| 6,033,186 A | * 3/2000 | Schilling et al. | 416/233 |
| 6,039,542 A | * 3/2000 | Schilling et al. | 416/233 |
| 6,099,257 A | * 8/2000 | Schilling | 416/229 A |
| 6,287,080 B1 | * 9/2001 | Evans et al. | 416/229 A |

FOREIGN PATENT DOCUMENTS

GB 2327467 1/1999

* cited by examiner

*Primary Examiner*—Christopher Verdier
(74) *Attorney, Agent, or Firm*—David L. Narcisco; McNees, Wallace & Nurick

(57) ABSTRACT

A thin film that forms an interface between metal surfaces and polymeric inserts of aircraft engine fan blades. The thin film is formed from a chemical comprised of carbon black, at least one evaporable solvent, a combination of phenolic-like resins dissolved in the solvent and the balance filler and inert ingredients. The thin film, upon drying of the evaporable solvent, forms a phenolic that bonds with the metallic portion of the fan blade. After the polymeric material is applied to recesses in the fan blade and cured, a chemical bond is formed between the thin film and the elastomeric inserts. The bonded structure has improved FWT peak stresses and improved fracture toughness.

16 Claims, 6 Drawing Sheets

ADHESION ENHANCERS TO PROMOTE BONDS OF IMPROVED STRENGTH BETWEEN ELASTOMERS METALS IN LIGHTWEIGHT AIRCRAFT FAN BLADES

BACKGROUND OF THE INVENTION

The present invention relates generally to a fan blade used in turbine engine applications composed of two or more components made from different materials, and more particularly to a formulation used to promote adhesion between the different materials in the construction of a lightweight jet engine fan blade.

Gas turbines include, but are not limited to, gas turbine power generation equipment and gas turbine aircraft engines. A gas turbine includes a core engine having a compressor to compress the air flow entering the core engine, a combustor in which fuel is burned by mixing it with compressed air to generate a propulsive gas flow, and a turbine which is rotated by the propulsive gas flow. The turbine is connected by a shaft to drive the compressor. In a typical gas turbine used in aircraft engine applications, the compressor portion is comprised of a low pressure compressor located in the front of the engine and a high pressure compressor located aft of the low pressure compressor and fore of the combustor section of the engine; while the turbine portion is comprised of a high pressure turbine located immediately aft of the combustor section and a low pressure turbine located aft of the high pressure turbine. The low pressure turbine is typically connected by a smaller diameter coaxial shaft to drive a fan located forward of the compressor section and to drive the low pressure compressor. The low pressure compressor sometimes is called a booster compressor or simply a booster and is optional. The high pressure turbine drives the high pressure compressor and provides auxiliary power to the engine and plane.

The compressors and the turbines have rotating portions and stationary portions. Typically, the rotating portions of the turbine extract some energy from the gases of the combusted fuel to provide energy to rotate the rotating portions of the compressor and fan and to supply other energy needs of the plane. The remaining energy from the gases provides the thrust to drive the engine. The stationary portions of the turbine and the compressor, frequently referred to as stators, direct the gases flowing through the engine. The fan, the compressor and the turbine portions of the engine are comprised of airfoils. The airfoils in the rotating portions of the engine are frequently referred to as blades and are attached to rotors or discs, while airfoils in the stator portions of the engine are referred to as vanes and are attached to casings or housings. Airfoils each including an airfoil portion attached to a shank portion which provide attachment to the associated structure, disks or casings. Typically, there are alternating circumferential rows of radially-outwardly extending rotor blades and radially-inwardly extending stator vanes. When present, a first and/or last row of stator vanes (also called inlet and outlet guide vanes) may have their radially-inward ends also attached to a non-rotating gas turbine stator casing. Counterrotating "stator" vanes are also known.

Conventional airfoil designs used in the compressor section at the engine typically have airfoil portions that are made entirely of metal, such as titanium, or are made of a composite such as the GE-90 fan blade used on the Boeing 777. A "composite" is defined to be a material having any (metal or non-metal) fiber filament embedded in any (metal or non-metal) matrix binder, but the term "composite" does not include a metal fiber embedded in a metal matrix. The term "metal" includes metal alloys such as titanium Alloy 6-2-4-2. An example of a composite is a material having graphite filaments embedded in an epoxy resin.

The all-metal blades, including costly wide-chord hollow blades, are heavier in weight which results in lower fuel performance and require sturdier blade attachments, while the lighter all-composite blades are more susceptible to damage from ingestion events. Known hybrid blades include a composite blade having an airfoil shape which is covered by surface cladding (with only the blade tip and the leading and trailing edge portions of the surface cladding comprising a metal) for improved resistance to erosion and foreign object impact. The fan blades typically are the largest (and therefore the heaviest) blades in a gas turbine aircraft engine, and the front fan blades are usually the first to be impacted by foreign objects such as birds. Various designs are under consideration for gas turbine blades having reduced weight for use as gas turbine fan blades that are comprised of metal and non-metal materials and have the capability to resist damage from ingestion of foreign objects. Some of these designs include lightweight inserts molded into cavities of metal blades. The cavities are regions of the blade that have had metal removed to lighten the blade, and the lightweight inserts are added to restore an aerodynamic shape to the blade that was altered by the inclusion of the cavity in the blade design. While both the lightweight inserts and the metallic portion of the blade are relatively monolithic materials having excellent strength, the interface between the lightweight inserts and the metallic portion of the blade is the weak link in which debonding and failure is most likely to occur. While failures which result in the separation of inserts from the blade are not catastrophic, they are undesirable as they will cause an aerodynamic inefficiency loss as well as an imbalance condition in the fan. What is needed are bonding materials and methods that promote adhesion between the metal portion of the blade and lightweight inserts and improve the adhesion of the lightweight inserts molded into blade pockets over the life of the blade.

SUMMARY OF THE INVENTION

The present invention is directed to improvements in adhesion between the metallic portion of a fan blade and lightweight inserts that are added to a fan blade to improve the aerodynamic flow of air over the blade. The fan blade is manufactured to have a lighter weight by removing metal at preselected locations. These preselected locations take the form of pockets. The locations of the pockets are preselected so as not to adversely affect the structural integrity of the blade. However, the pockets do adversely impact the aerodynamic flow of air over the blade. The aerodynamic flow is restored by filling the pockets with the lightweight inserts. Overall, the final blade retains its structural integrity that is, its resistance to foreign object impacts and the like and its aerodynamic flow, even though its weight has been reduced.

The formulation of the lightweight insert comprises an elastomer composition having an optional anti-oxidant, an optional ultraviolet absorber (UVA) and an optional hindered amine light stabilizer (HALS). The elastomer is formed by mixing a curative with a prepolymer and casting the resulting mixture into a mold that includes the pockets formed in the metallic blade. The specific composition of the elastomer is the subject of a copending, related application, 13DV-13058, assigned to the assignee of the present invention and incorporated herein by reference.

Although both the insert, comprised of cured elastomer, and the metallic blade are monolithic materials having good strength, the interface between the metallic blade and the elastomeric insert, that is, the metallic pockets and the faces of the elastomeric insert that contact the metallic pockets, tends to be the weak point in the system, even though the elastomer may form a strong bond with the metallic blade. As a result of the centrifugal forces resulting from the high speed rotation of the fan blade and any damage to the inserts resulting from foreign object impact that may weaken the bond, failure of the blade, which is defined herein to be the separation of the elastomeric insert from the metallic blade, most frequently occurs at this interface. The solution to the problem is to strengthen the bond between the insert and the metallic pockets to the blade.

One solution to this problem is to apply a chemical formulation to the blade that promotes improved bonding between the metallic blade and the elastomeric insert. The chemical formulation can be applied to the blade or to the elastomeric insert. However, the adhesion at the interface between the chemical formulation and the metallic blade and between the chemical and the elastomeric insert must be stronger than the adhesion between the elastomeric insert and the metallic blade. Even though the interface formed by the chemical formulation between the blade and the insert may still be the weak link in the system, any improvement in strength at the interface will extend the life of the blade by increasing the mean time between failures. As used herein, the chemical formulation applied to improve bonding between a metallic blade and an elastomeric insert is referred to as an adhesion enhancer.

Another solution to this problem is to roughen the pockets of the blade so that a mechanical bond can be formed between the elastomeric insert and the metallic blade. This bond provides additional strength in addition to the chemical bond that is formed between the insert and the metallic portion of the blade. An additional benefit resulting from this surface roughness is that the surface area available for chemical bonding of the insert to the blade is also enhanced.

An advantage of the present invention is that the interface between the metallic portion of blade and the elastomeric insert can be made stronger and more reliable, thereby extending the life of the blade.

Another advantage of the present invention is the improved bonding between the metallic portion of the blade and the elastomeric insert can be accomplished with a minimal amount of effort, by either appropriate application of a chemical that promotes improved adhesion or by manufacturing a blade that has an interface surface that can include both components of chemical bonding and improved mechanical bonding. Of course, a combination of a chemical that improves adhesion between an elastomeric insert and a blade having improved mechanical bonding capabilities can also be utilized.

Another advantage of the present invention is that the elastomer can still be cured directly to the blade, regardless of the type of adhesion enhancer that is selected. Because the pockets form part of the mold, the elastomer will mate with a preapplied chemical that promotes adhesion, or with an interface surface area of the blade that has been roughened. Of course, both the adhesion enhancer and the roughened blade result in no misfit between the pocket and the blade, so that the blade having the cured elastomeric insert is aerodynamic, with little or no trimming required to remove excess material. This permits unimpeded flow of air entering the compressor while allowing the blade to operate at temperatures up to 310° F. (155° C.).

Other features and advantages of the present invention will be apparent from the following more detailed description of the preferred embodiment, taken in conjunction with the accompanying drawings which illustrate, by way of example, the principles of the invention.

DETAILED DESCRIPTION OF THE INVENTION

Figure 1:
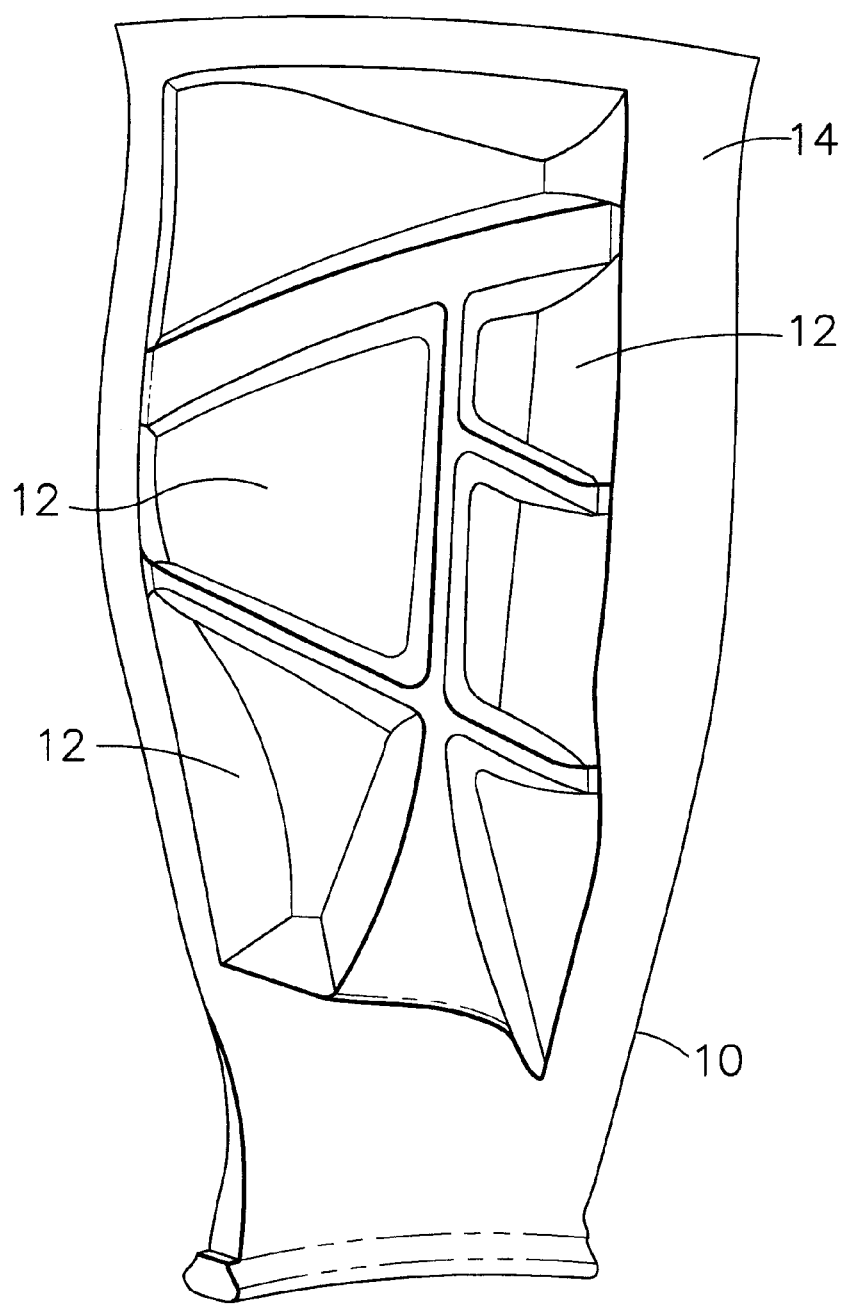
FIG. 1 is a perspective of an aircraft engine fan blade, showing pockets formed therein.

Referring now to the drawings, wherein like numerals represent like elements throughout, FIG. 1 schematically shows a aircraft engine fan blade 10 used in the preferred embodiment of the present invention. The fan blade 10 is made from a metal, typically a titanium alloy such as Ti 6-2-4-2 and has a convex side and a concave side. Six pockets 12 forming recesses typically are fabricated into the concave (pressure) side 14, as shown in FIG. 1. The number of pockets is dependent upon the configuration and size of the blade, and fewer or more pockets may be included as necessary. The pockets may be formed in the blade by any conventional means, such as by machining. Conveniently, the blade may be fabricated by casting or forging, with the pockets being an integral part of the fabricated configuration. In accordance with the present invention, at least the pockets of the blade are cleaned to remove any detrimental dirt, oils or tightly adhering contaminants that may adversely affect application of an adhesion enhancer. Preferably, the entire blade 10 is cleaned as a preparatory step for application of the adhesion enhancer. It may be necessary to mask any apertures or closely-toleranced interfaces included in the blade design, as the adhesion enhancer may block apertures or interfere with closely-toleranced fit-ups.

After the required cleanliness of the blade has been achieved, the adhesion enhancer is applied to at least the blade pockets so as to form a uniform film over substantially the entire surface of the pockets, which are the portions of the blade that will be mated with elastomeric insert material. The adhesion enhancer may be applied by dipping, spraying or brushing in order to apply a thin, relatively uniform film over at least those portions of the blade that will from an interface with the elastomeric insert. Although it is preferred that the applied adhesion enhancer air dries to form a single coat, relatively uniform film, it may be necessary to provide a drying cycle that includes heating the blade after application of the adhesion enhancer in an oven at a temperature above ambient. A second coat of the adhesion enhancer may be applied if necessary.

Figure 2:
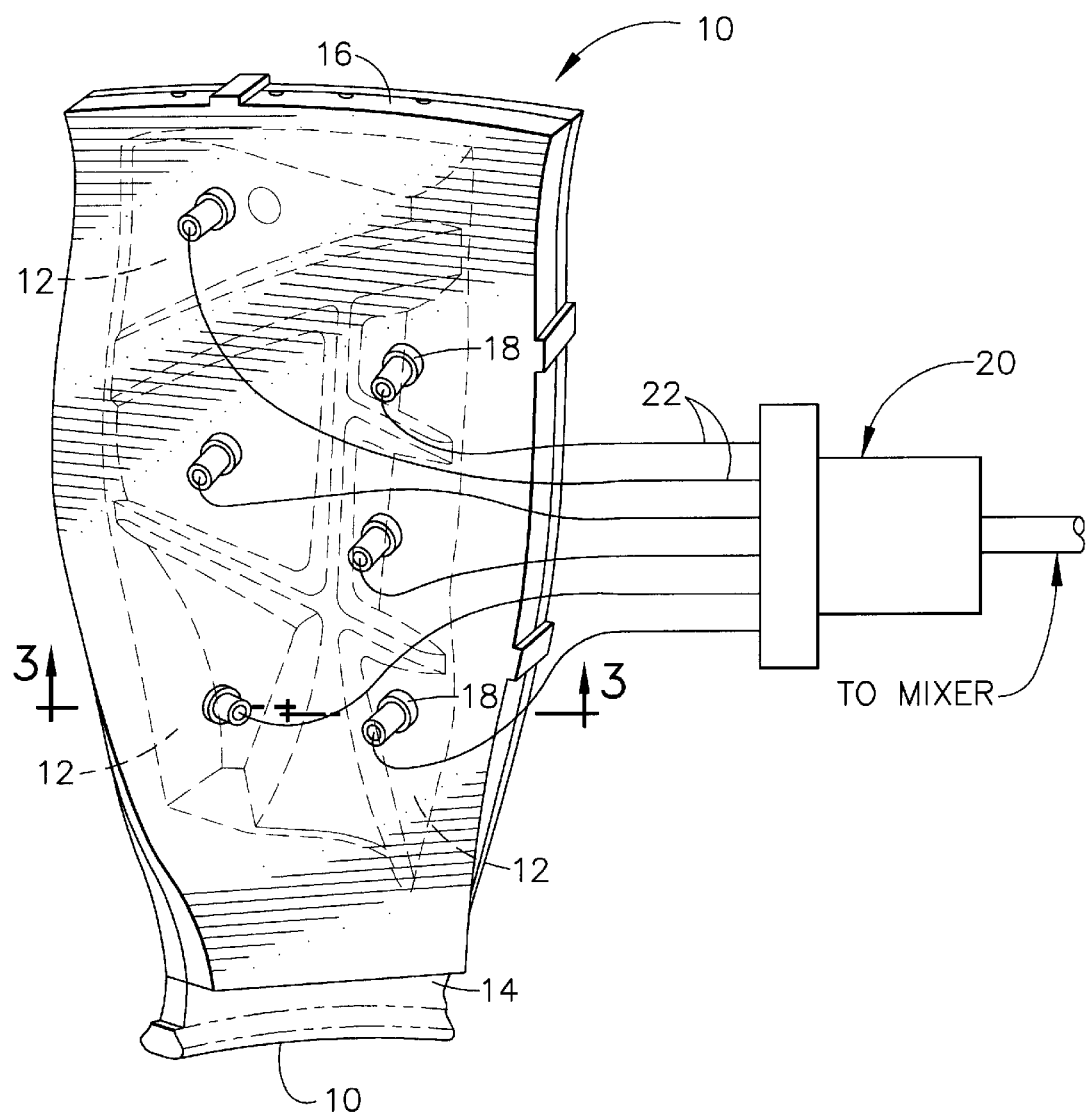
FIG. 2 is a perspective of the fit-up of a blade to an injection system utilized in the present invention.
Figure 3:
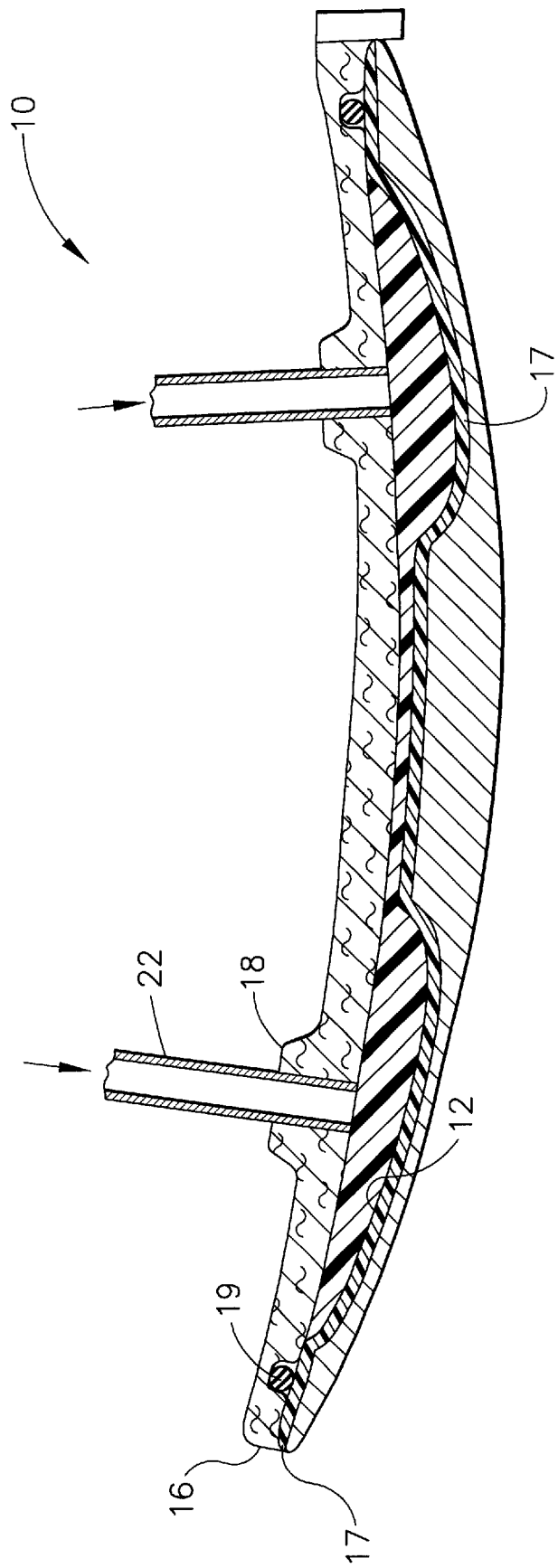
FIG. 3 is a schematic cross-sectional view of the blade of FIG. 2, taken along lines 3—3 of FIG. 2, showing the adhesion enhancer of the present invention applied to the pressure side of the blade.

Referring now to FIG. 2, and in accordance with the process of the present invention, a caul sheet 16 is fitted, such as by clamping, to the contour of the concave side 14 of fan blade 10. As shown in FIG. 3, the concave side 14 of the fan blade 10 includes a thin film of an applied adhesion enhancer 17. The adhesion enhancer is very thin, of the order of a few mils or less in thickness. The thickness is exaggerated for the purpose of clarity. Although adhesion enhancer 17 is applied to the concave side 14 of the fan blade as shown in FIG. 3, it is only necessary for adhesion enhancer 17 to be applied to regions where it will interface with elastomeric inserts, that is in pocket cavities 12 in FIGS. 1, 2 and 3. Adhesion enhancer 17 may be applied over the entire surface of the blade if dictated by simplification of the manufacturing process. Referring again to FIGS. 2 and 3, caul sheet 16 is fitted against concave side 14 of blade 10 and sealed with an O-ring 19, which is retained in a groove around the periphery of caul sheet 16, as shown in FIG. 3 to form a temporary mold with the pockets and restrained against the blade, typically with clamps (not shown). Caul sheet 16 is provided with at least one and typically with a plurality of injection ports 18, which are located on caul sheet 16 so as to correspond with the location of pockets 12 on fan blade 10 when caul sheet 16 is fitted on to fan blade 10. Although caul sheet 16 is shown with a plurality of injection ports 18, if there is communication among the pockets 12 within blade 10, a single injection port 18 may be utilized. A fluid elastomeric composition that will form the elastomeric insert upon curing in the shape of the mold (which includes the blade pockets in this invention) is injected into the temporary mold through injection port 18. If a plurality of injection ports is utilized, the elastomeric composition is injected into an injection manifold 20 for distribution to ports 18 as shown in FIG. 2. A plurality of tubes 22 lead from injection manifold 20 to injection ports 18 on caul sheet 16, the number of tubes corresponding to the number of injection ports. The elastomeric composition is then injected into each of the pockets 12, and the pressure is maintained until the elastomeric composition is gelled. The elastomeric composition typically is cured by exposure to a preselected, elevated temperature for a preselected time. However, certain elastomeric composition formulations that may be used in the practice of this invention do not require elevated temperature exposure, as they cure at ambient temperatures. The pockets must be filled with polymer so that the liquid polymer contacts the adhesion enhancer during curing. Pressure is maintained so that the polymer does not peel away from the pocket walls as the elastomeric composition cures. Adhesion enhancer 17, already tightly bonded as a thin film to blade pockets of blade 10 reacts with the elastomer during the curing cycle to provide better adhesion than would otherwise be obtained, so that a strong chemical bond between the adhesion enhancer and the elastomeric composition is formed. After curing of the elastomeric composition is accomplished, the caul sheet is demolded from the blade, that is, it is removed from the concave side of the blade. The resulting blade includes inserts molded into pockets on the blade and having improved adhesion due to application of an intermediary adhesion enhancer between the metallic blade and the elastomeric inserts.

In a preferred embodiment of the invention, the elastomeric composition that forms the elastomeric inserts is a polyurethane that is formed by combining a prepolymer, a curative and an optional antioxidant, a HALS and a UVA. The metallic blade is a titanium alloy, preferably Ti-6-2-4-2 into which a plurality of pockets have been formed. One type of adhesion enhancer that can be used is THIXON®, a vulcanizable film formed by elevated temperature cross-linking. Another and preferred type of adhesion enhancer is a chemical mixture of solvents that act as a carrier for at least one filler and dissolved phenolic resins derived from substituted phenols, including, but not limited to phenol, o-cresol, p-cresol, 2,6-xylenol, 2,4-xylenol, alkyl phenol and t-butylphenol. Other equivalent variations of these chemical species may be substituted or additionally included in the mixture. The carriers and solvents will evaporate, leaving the filler and phenolic resins that will provide an adhesive bond with the titanium alloy blade and the elastomer. Preferred solvents include at least one solvent selected from the group consisting of ethyl alcohol, methyl alcohol, methylethylketone (MEK) and methylisobutylketone (MIK) and combinations thereof. A preferred adhesive formed by the chemical upon evaporation of the solvent is phenolics and a preferred filler is carbon black. A preferred composition of the chemical upon application to the fan blade is, in weight percentage, up to 2% carbon black, up to 50% ethyl alcohol, up to 2% methanol, up to about 45% phenolic resins and the balance unknown ingredients and filler. Readily available chemical formulations that can be used include the CHEM-LOK® series available from Lord Corporation of Erie, Pa. In a most preferred embodiment, the adhesion enhancer is a solvent based chemical formulation that is known by the trade name TY-PLY BN® available from Lord Corporation of Erie, Pa. Although the exact chemical formulation of TY-PLY BN is a trade secret, TY-PLY BN is known to include, a small percentage of carbon black, ethyl alcohol and methanol as carriers, phenolic-type resins comprising about one half of the chemical formulation and the balance unknown ingredients and filler. The preferred solvent adhesion enhancer is applied to the concave side of the blade that includes the blade pockets by spraying or brushing. In a preferred embodiment, the adhesion enhancer is permitted to air dry for about at least 30 minutes at ambient temperature in an area having sufficient ventilation so as to eliminate the build-up of fumes as the solvents evaporate. After the solvents have evaporated, a thin film of adhesion enhancer remains firmly adhered to the concave side of the blade. The blade is inspected, and application of a second coat of adhesion enhancer may be applied. However, application of the second coat is optional. If faster drying of the adhesion enhancer is required, after application it may be baked in an oven at a temperature of about 120° F. (49° C.) for about 10 minutes.

After the adhesion enhancer is dried and is adhering to the metal blade, the caul sheet is applied to the concave side of the blade so that a temporary mold is formed by the blade pockets and caul sheet. The polyurethane elastomer is then prepared by adding optional anti-oxidant and/or optional ultraviolet absorber and/or optional hindered amine light stabilizer to the curative. These ingredients are then heated until melting occurs and then thoroughly mixed to form a first mixture. A prepolymer of polyurethane, such as toluene di-isocyanate (TDI) capped polyether with an isocyanate functionality (NCO) content of 4.1–4.6%, is heated to its melting point and mixed with the first mixture to form a homogeneous second mixture. The second mixture is cast into the pre-heated mold formed by the caul sheet in the manner previously described. After the pockets are filled with the second mixture, the assembly is held for a sufficient period of time to permit the polymer to gel in the pockets, typically about 5 minutes.

Once the polymer has gelled, the fan blade is placed into an oven at a temperature of about 210–250° F. (99–121° C.) for a time sufficient to permit cross-linking to at least partially develop within the polymer to provide sufficient rigidity to allow demolding of the polyurethane, that is, the removal of the composite caul sheet and associated tooling from the back or concave side 14 of the blade 10 while leaving the polyurethane within the pockets. This time is typically from about 0.5 to about 2 hours. The blade is then placed into an oven at a temperature of about 212–320° F. (100–160° C.) for about 16–50 hours for curing. During the curing operation, crosslinking occurs not only within the polyurethane, but also across the interface between the polyurethane and film 17. This additional cross linking between film 17 on one side and the adhesion of film 17 to the fan blade on the other side provides a stronger bond than is otherwise achievable without an adhesion enhancer, thereby providing the system with improved creep resistance to loadings experienced during operation of the gas turbine engine.

Figure 4:
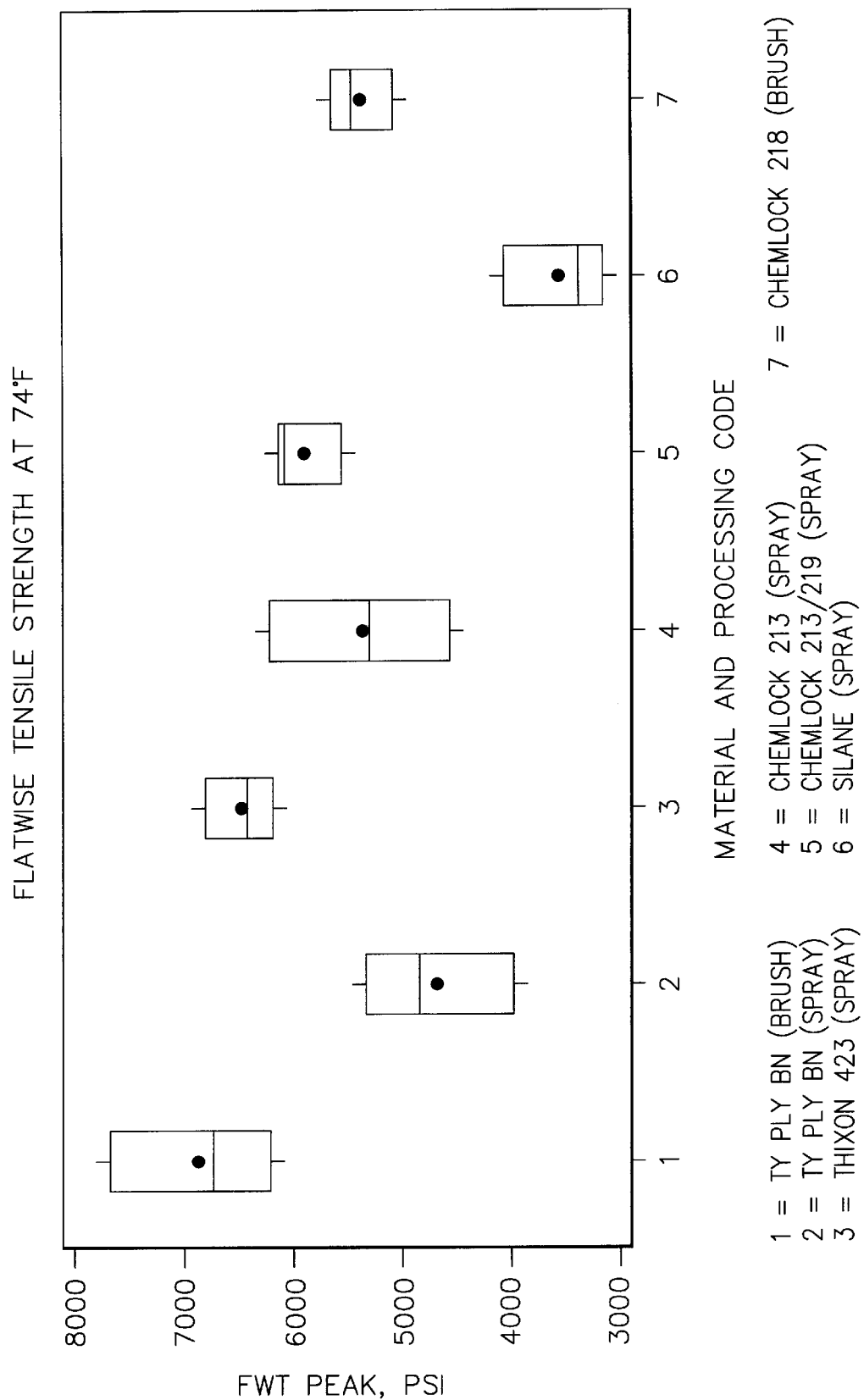
FIG. 4 is a graph of the performance of several different adhesion enhancers as a function of flatwise tensile strength at 74° F.

FIG. 4 shows the performance of several adhesion enhancers as a function of peak flatwise tensile stress prepared and tested in conjunction with an elastomeric composition utilized in blade pockets. This bar graph shows the peak flatwise tensile (FWT) strength at ambient temperature of different adhesion enhancers. The flatwise tensile strength provides an indication of the peak stress, which is twice the engineering stress of the material. The best performing adhesion enhancer at room temperature was TYPLY BN® applied by brushing to a surface grit blasted with 120 grit at 50 psi. When the same film was applied by spraying to a shotpeened surface that was subsequently grit blasted, the FWT strength fell from about 7000 to about 5000 psi. THIXON® 423 and CHEMLOK® were also above 5000 psi when applied to shotpeened and grit blasted surfaces.

Figure 5:
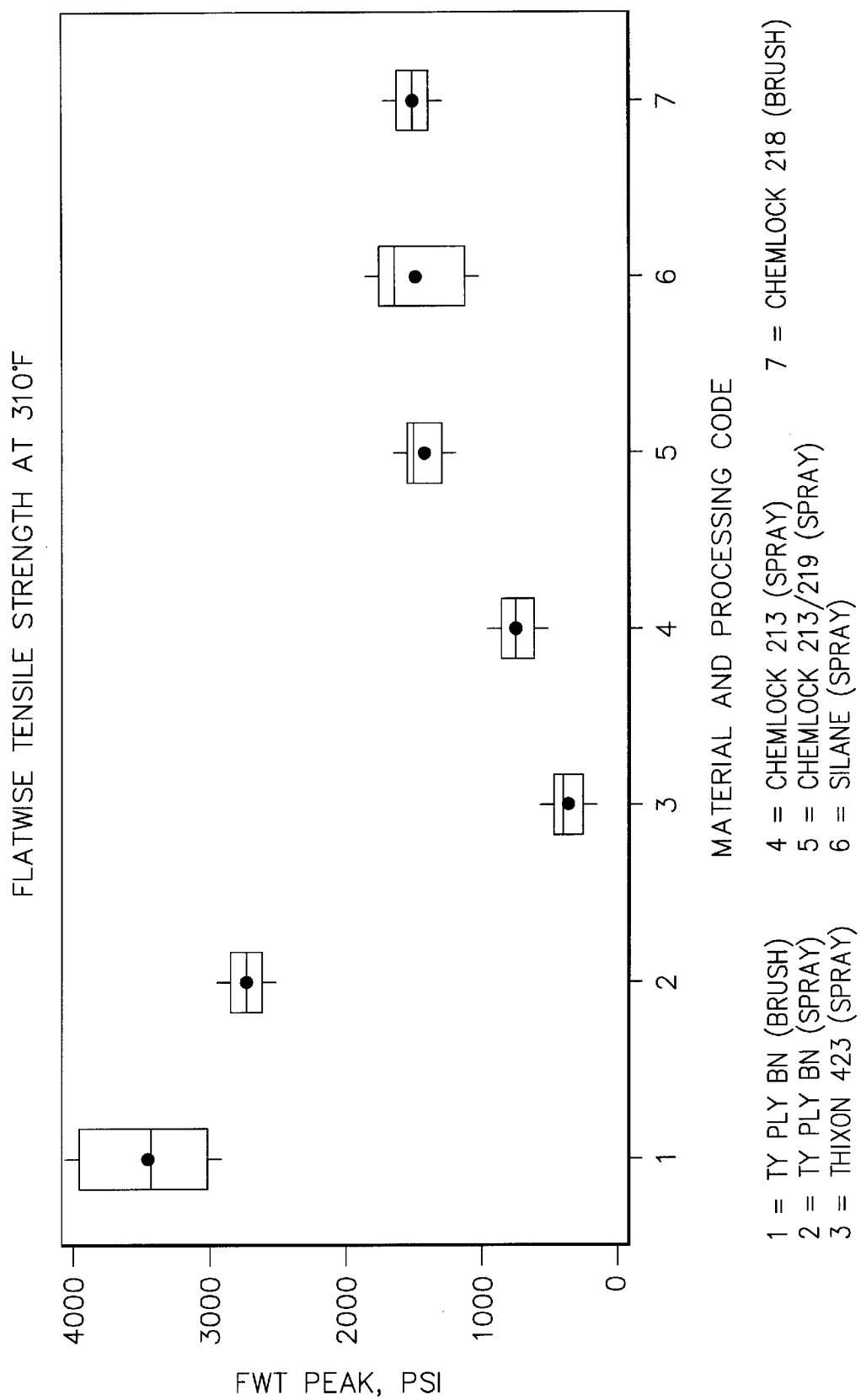
FIG. 5 is a graph of the performance of several different adhesion enhancers as a function of flatwise tensile strength at 310° F.
Figure 6:
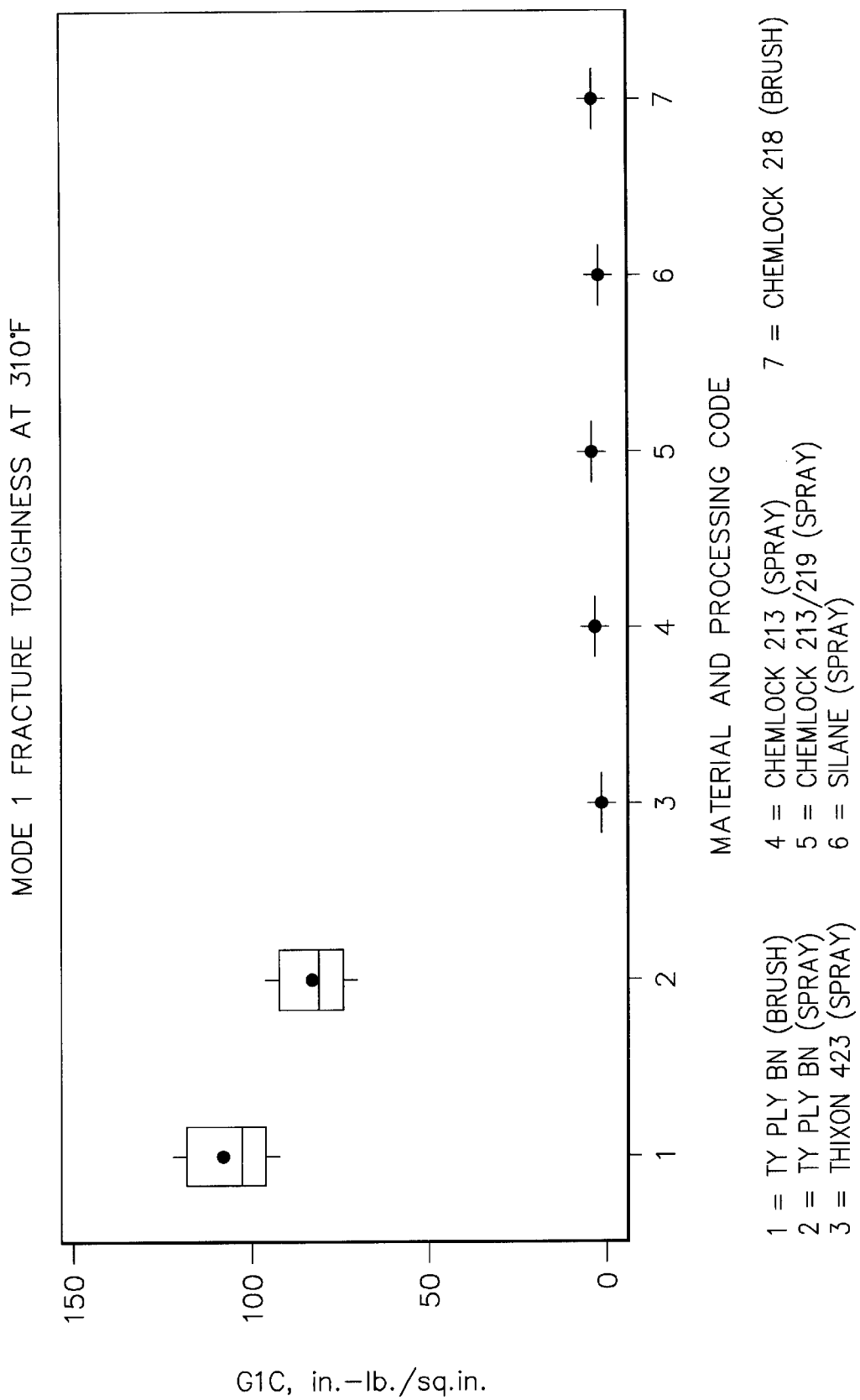
FIG. 6 is a graph of the performance of several different adhesion enhancers as a function of fracture toughness at 310° F.

Referring now to FIG. 5, which shows the performance of the same adhesion enhancers as a function of FWT peak stress at a temperature of 310° F. (155° C.), the TYPLY BN® applied by brush had a FWT peak strength in excess of 3000 psi. The TYPLY BN® applied by spray had a FWT peak strength just below 3000 psi. These enhancers were clearly superior to the other tested enhancers that had FWT peak strengths below 2000 psi. Two enhancers, THIXON® 423 and CHEMLOK® 213 had FWT peak strengths below about 1000 psi. FIG. 6, a graph showing the performance of the adhesion enhancers of the present invention as a function of Mode I fracture toughness as 310° F. (155° C.), indicates the same trend. Mode I fracture toughness is a standard measure of crack propagation as a tensile stress is applied perpendicular to a crack surface. The TYPLY BN® applied by brush and by spray displayed superior fracture toughness performance, with the remaining adhesion enhancers having inferior fracture toughness performance.

Because blades can operate at elevated temperatures in the region of about 300° F. (149° C.), the elevated temperature properties of the adhesion enhancers are of particular significance. The location of blades at the front of the engine means that any ingested foreign objects will likely first make contact with the blade, so fracture toughness is especially important. The data clearly indicates that the preferred adhesion enhancer is TYPLY BN®.

Although the present invention has been described in connection with specific examples and embodiments, those skilled in the art will recognize that the present invention is capable of other variations and modifications within its scope. These examples and embodiments are intended as typical of, rather than in any way limiting on, the scope of the present invention as presented in the appended claims.

What is claimed is:

1. A lightweight aircraft engine fan blade construction, comprising:

a metal blade having at least one pocket;

an elastomer cured within the at least one blade pocket by cross-linking that fills the at least one blade pocket; and an adhesion enhancer intermediate between the elastomer within the at least one blade pocket and the at least one pocket of the metal blade, the adhesion enhancer being a thin film that is adhered to the surface of the at least one blade pocket of the metal blade and that is cross-linked to the elastomer within the at least one blade pocket.

2. A lightweight aircraft engine fan blade construction, comprising:

a metal blade having at least one pocket;

a polyurethane elastomer cured within the at least one blade pocket by cross-linking, the elastomer filling the at least one blade pocket; and a thin film of an adhesion enhancer intermediate between the elastomer and the blade comprised of at least one filler and an adhesive, the adhesive providing bonding with the metallic blade and the adhesive providing cross linking with the elastomer.

3. The lightweight fan blade construction of claim 2 wherein the thin film of adhesion enhancer is formed from a chemical that includes an evaporable solvent, phenolic-type resins dissolved in the solvent, and carbon black.

4. The lightweight fan blade construction of claim 3 wherein the evaporable solvent is selected from the group consisting of ethyl alcohol, methyl alcohol, MEK, MIK and combinations thereof.

5. The lightweight fan blade construction of claim 3 wherein the phenolic-type resins are selected from the group consisting of phenol, o-cresol, p-cresol, 2,6-xylenol, 2,4-xylenol, alkyl phenol, t-butylphenol and combinations thereof.

6. The lightweight fan blade construction of claim 3 wherein the chemical is comprised of, in weight percent, up to 2% carbon black, up to 50% ethyl alcohol, up to 2% methanol, up to 45% of phenolic resins and the balance filler and inert ingredients.

7. The lightweight fan blade construction of claim 3 wherein the chemical is TYPLY BN® comprised of at least carbon black, an organic solvent, phenolic-type resins and filler.

8. The lightweight fan blade construction of claim 2 wherein the adhesive is a phenolic resin.

9. The lightweight fan blade construction of claim 2 wherein the metal blade is selected from the group consisting of titanium and titanium alloys.

10. The lightweight fan blade construction of claim 2 wherein the elastomer cured within the blade pocket is a polyurethane having optional antioxidants, hindered amine light stabilizers and ultraviolet absorbers.

11. A lightweight fan blade construction, comprising:

a titanium alloy fan blade having at least one pocket fabricated on its pressure side;

a polyurethane having optional antioxidants, hindered amine light stabilizers and ultraviolet absorbers cured within the at least one pocket;

a thin film of an adhesion enhancer formed from a chemical comprised of carbon black, at least one evaporable solvent, a combination of phenolic resins and the balance filler and inert ingredients.

12. The lightweight fan blade construction of claim 11 wherein the chemical forming the adhesion enhancer is comprised of, in weight percent, up to 2% carbon black, up to 50% ethyl alcohol, up to 2% methanol, up to 45% of phenolic resins and the balance filler and inert ingredients.

13. The lightweight fan blade construction of claim 11 wherein the chemical forming the adhesion enhancer is TYPLY BN® comprised of at least carbon black, an organic solvent, phenolic-type resins and filler.

14. An adhesion enhancer for use with a lightweight metallic fan blade for an aircraft gas turbine engine that incorporates elastomeric inserts, comprising:

a thin film positioned as an interface between the metallic fan blade and the elastomeric inserts and formed from a chemical comprised of carbon black, at least one evaporable solvent, a combination of phenolic resins dissolved in the solvent and the balance filler and inert ingredients, the thin film formed upon drying of the evaporable solvent forming an adhesive bond with the metallic fan blade and a chemical bond with the elastomeric inserts, the bonded structure having FWT peak stress above at least about 1000 psi at 310° F.

15. The adhesion enhancer of claim 14 wherein the chemical is comprised of, in weight percent, up to 2% carbon black, up to 50% ethyl alcohol, up to 2% methanol, up to 45% of a combination of phenolic resins dissolved in the solvent and the balance filler and inert ingredients.

16. The lightweight fan blade construction of claim 14 wherein the chemical forming the adhesion enhancer is TYPLY BN® comprised of at least carbon black, an organic solvent, phenolic-type resins and filler.

* * * * *